(12) United States Patent
Hasenour

(10) Patent No.: US 10,206,332 B2
(45) Date of Patent: Feb. 19, 2019

(54) DRAPER BELT GUIDE

(71) Applicant: Deere and Company, Moline, IL (US)

(72) Inventor: Anthony M. Hasenour, Port Byron, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/494,482

(22) Filed: Apr. 22, 2017

(65) Prior Publication Data

US 2018/0303035 A1 Oct. 25, 2018

(51) Int. Cl.
*A01D 61/00* (2006.01)
*A01D 61/02* (2006.01)

(52) U.S. Cl.
CPC .......... *A01D 61/006* (2013.01); *A01D 61/02* (2013.01)

(58) Field of Classification Search
CPC ...... A01D 57/20; A01D 41/14; A01D 61/002; A01D 43/06; A01D 61/006; A01D 61/02; A01F 15/18; A01F 2015/183
See application file for complete search history.

(56) References Cited

U.S. PATENT DOCUMENTS

| | | | |
|---|---|---|---|
| 2,732,059 A | 1/1956 | Erisman | |
| 3,980,174 A | 9/1976 | Conrad | |
| 4,225,036 A * | 9/1980 | Michael | B65G 15/46 198/840 |
| 4,484,903 A * | 11/1984 | Schneider | F16G 5/16 474/242 |
| 5,369,477 A | 11/1994 | Foote | |
| 5,768,986 A * | 6/1998 | Arnold | A01F 15/18 100/88 |
| 6,109,427 A | 8/2000 | Hosch et al. | |
| 6,152,282 A * | 11/2000 | Ewan | B07C 5/36 198/382 |
| 6,351,931 B1 | 3/2002 | Shearer | |
| 7,640,720 B1 | 1/2010 | Lovett et al. | |
| 8,065,865 B1 * | 11/2011 | Dow | A01D 57/20 56/181 |
| 8,291,686 B1 | 10/2012 | Cormier | |

(Continued)

FOREIGN PATENT DOCUMENTS

| | | |
|---|---|---|
| DE | 3229061 | 2/1984 |
| EP | 0906878 | 4/1999 |

OTHER PUBLICATIONS

Michael A. Hosch, "V-Guided Belts a Much Better Option for Keeping Conveyor Belts Centered Than Crowned Rollers", http://beta.machinedesign.com/mechanical-drives/v-guided-conveyor-belts-much-better-option-keeping-conveyor-belts-centered-crowned?utm_test=redirect&utm_referrer= (Oct. 7, 2010).

(Continued)

*Primary Examiner* — Arpad Fabian-Kovacs
(74) *Attorney, Agent, or Firm* — Rathe Lindenbaum LLP

(57) ABSTRACT

A harvester head may include a roller having a groove and supporting a draper belt. The draper belt may include a web and an elastomeric belt guide projecting from web, wherein the belt guide has outer side surfaces extending at an angle of no greater than 100° relative to the second surface when the belt guide wrapping about the roller within the groove. The groove may have outer side surfaces, each outer side surface extending at angle of no greater than hundred degrees relative to an outer surface of the roller.

20 Claims, 4 Drawing Sheets

(56) References Cited

U.S. PATENT DOCUMENTS

| | | | |
|---|---|---|---|
| 8,573,388 B2* | 11/2013 | Hoffman | A01D 41/14 198/814 |
| 8,579,774 B2* | 11/2013 | Derscheid | A01F 15/18 198/835 |
| 9,096,376 B1 | 8/2015 | Wood et al. | |
| 9,901,035 B2* | 2/2018 | Ryz | A01F 15/18 |
| 2005/0022491 A1* | 2/2005 | Zurn | A01D 57/20 56/16.4 R |
| 2007/0193243 A1* | 8/2007 | Schmidt | A01D 41/14 56/181 |
| 2008/0092508 A1* | 4/2008 | Talbot | A01D 57/20 56/181 |
| 2009/0308042 A1* | 12/2009 | Lovett | A01D 57/20 56/153 |
| 2010/0313540 A1* | 12/2010 | Sauerwein | A01D 41/14 56/181 |
| 2011/0315524 A1* | 12/2011 | Kidd | A01D 61/02 198/837 |
| 2012/0042617 A1* | 2/2012 | Dow | A01D 61/002 56/14.5 |
| 2012/0233974 A1* | 9/2012 | Cormier | A01D 57/20 56/181 |
| 2015/0075130 A1* | 3/2015 | Ryz | A01F 15/18 56/341 |
| 2016/0096685 A1* | 4/2016 | Sherwood | B65G 21/22 198/678.1 |

OTHER PUBLICATIONS 2008 brochure for "MacDon Flex and Rigid Draper Headers for Combines" (2008).
EP Search Report for EP 18168407.7-1006 dated Sep. 6, 2018.

* cited by examiner

DRAPER BELT GUIDE

CROSS-REFERENCE TO RELATED PATENT APPLICATIONS

The present application is related to co-pending US patent application Ser. No. 15/494,481 filed on the same day herewith by Anthony M. Hasenour et al. and entitled DRAPER BELT ASSEMBLY, the full disclosure of which is hereby incorporated by reference.

BACKGROUND

Draper belts are used on harvester heads to convey severed crop material transversely across the head to a feeder housing that further conveys the crop material into the harvester for handling, such as threshing and cleaning. During operation, the draper belts may become misaligned, potentially damaging the belt or other components of the harvester head.

BRIEF DESCRIPTION OF THE DRAWINGS

Figure numeral one is a side view of an example draper belt extending about supporting rollers.

DETAILED DESCRIPTION OF EXAMPLES

Figure 1:
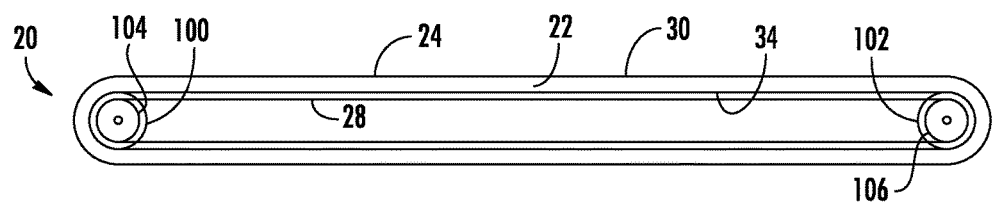

In an attempt to maintain alignment of the draper belts with their supporting rollers and other structures on the harvester head, some draper belts include a V-shaped guide that extends in a corresponding V-shaped groove of a drive roller and that extends within a corresponding V-shaped groove of an idler roller. However, such V-shaped guides are still susceptible to dislodgment from the V-shaped grooves and misalignment of the belt when encountering loading.

Some harvester heads have flexible cutter bars. With such harvester heads, the flexible cutter bar and the draper belts flex to accommodate changes in the underlying terrain. During such flexing, the draper belts may experience relatively large loads. Such large loads may result in an even greater risk of the belt guide of the belt becoming dislodged from the roller grooves and the draper belt becoming misaligned with respect to the rollers and other structures of the harvester head.

Disclosed herein are various examples of a draper belt and a harvester head that may better maintain alignment of the draper belt with respect to its supporting rollers and other components of the harvester head. Disclosed are various examples of a draper belt having at least one belt guide that is less likely to become dislodged from the corresponding grooves of the drive roller and the idler roller supporting the belt. Disclosed are various examples of a draper belt guide having sidewalls or side surfaces that better mate or abut with internal sides of the roller grooves such that the belt guide is less likely to ride up the internal sides of the groove and become dislodged from the roller grooves when encountering external forces or external loading.

The example draper belt guides may have outer side surface that extend at an angle of no greater than 100° relative to the bottom surface of a web of the draper belt. The example draper belt guides may have outer side surfaces that extend at an angle less than 95° relative to the bottom surface of a web of the draper belt. The example draper belt guides may have outer surfaces that extend perpendicular or substantially perpendicular to the bottom surface of the web of the draper belt. In some implementations, the example draper belt guides may extend at an acute angle with respect to the bottom surface of the web of the draper belt so as to form an undercut in the belt guide.

The example harvester head may include rollers, such as a drive roller and an idler roller, wherein at least one of the drive roller and the idler roller has inner side surfaces extending at an angle of no greater than 100° relative to the outer surface of the roller. In one implementation, at least one of the drive roller and the idler roller has inner sides of the extending at an angle of no greater than 95° relative to the outer surface of the roller. In one implementation, at least one of the drive roller and the idler roller has inner sides or side surfaces that are perpendicular or substantially perpendicular relative to the outer surface of the roller. In some implementations, at least one of the drive roller and the idler roller has inner sides or side surfaces form an undercut in the roller so as to mechanically capture the belt guide when the belt guide is being expanded or compressed as it wraps about the roller within the groove.

In the examples disclosed herein, the belt guide has a first shape and occupies a first percentage of the corresponding grooves of the drive and idler rollers prior to wrapping about the rollers. In the example disclosed herein, the belt guides widen and expand when wrapping about the rollers so as to have a second shape different than the first shape and size to occupy a second percentage, larger than the first percentage, of the corresponding grooves of the drive and idler rollers. The shape or angles of the interior sides or side surfaces of the roller grooves and the exterior side surfaces of the belt guide cooperate to more securely retain or even lock the belt guide within the corresponding grooves as the belt guides wrap around or about the rollers within the groove.

Figure 2:
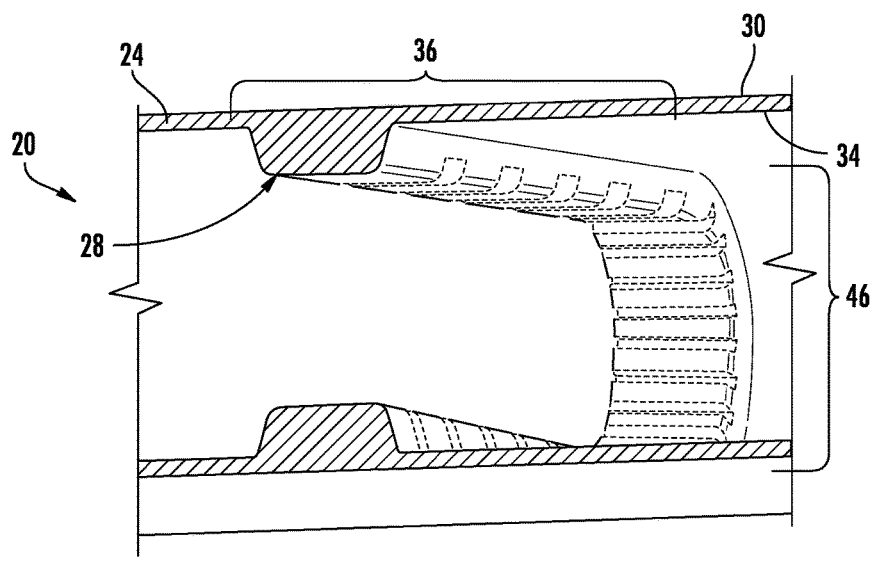
FIG. 2 is a fragmentary sectional view of portions of the draper belt of FIG. 1.
Figure 3:
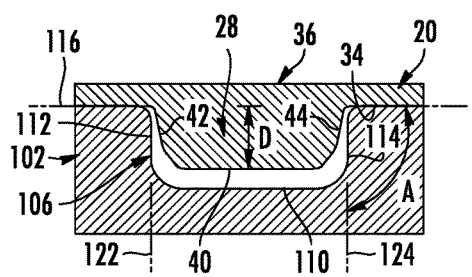
FIG. 3 is a fragmentary sectional view of a first portion a belt guide of the draper belt of FIG. 1 interacting with a groove of one of the supporting rollers, wherein the first portion of the belt guide is not wrapping about the supporting roller.
Figure 4:
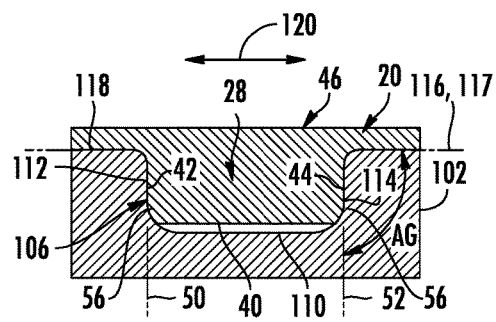
FIG. 4 is a fragmentary sectional view of a second portion of the belt guide of FIG. 1 while the second portion of the belt guide is wrapping about the supporting roller within the groove.

FIGS. 1-4 illustrate an example draper belt 20 and its interaction with grooves its supporting rollers. FIG. 1 is a side view of an example draper belt 20 of a harvester head, illustrated as being supported by rollers 100, 102 (shown in broken lines) having grooves 104, 106, respectively. FIG. 2 is a sectional view of a portion of belt 20, omitting illustration of one of the rollers. FIGS. 3 and 4 illustrate interaction of belt 20 with different portions of one of the rollers.

As shown by FIG. 1, belt 20 is configured to continuously wrap about a pair of opposite rollers, such as the example rollers 100, 102 illustrated in broken lines. For purposes of this disclosure, the phrase "configured to" denotes an actual state of configuration that fundamentally ties the stated function/use to the physical characteristics of the feature proceeding the phrase "configured to". Rollers 100, 102 comprise outer grooves 104, 106, respectively. In one implementation, is continuous and lacks a seam or seams. In another implementation, as shown by broken lines, belt 20 may comprise a seamed belt having at least one seam 22 at which end portions of belt 20 are joined to one another or retained relative to one another.

Belt 20 comprises web 24 and belt guide 28. Web 24 comprises an expanse of flexible, in one implementation, elastomeric, material having an upper outer surface 30 to carry crop material and a second opposite inner surface 34 which face rollers 100, 102 or one another. Although not illustrated, in some implementations, outer surface 30 may include additional structures, such as cleats, to facilitate conveyance of crop material. In such an implementation, such cleats may extend substantially perpendicular to guide 28 at spaced locations along surface 24.

Belt guide 28 comprises an elongate rib, bar or other protuberance projecting from surface 34 in a direction away from surface 30. Belt guide 28 is sized, shaped and located so as to be received within both of grooves 104, 106 of rollers 100, 102 when belt 20 is positioned on in about such rollers 100, 102. Belt guide 28 tracks grooves 104, 106 to maintain the positioning and alignment of belt 20 in a harvester head.

As further shown by FIG. 2, in one implementation, belt guide 28 has a continuous smooth uninterrupted lower surface. In other implementations, as indicated by broken lines, the innermost surface of guide 28 may be cogged. Such cogging may facilitate our quit bending of guide 28 as it wraps about roller 102. In some implementations, such cogging may further facilitate the transfer of force to belt 20 through the use of teeth on a drive roller, such as roller 102 or roller 104.

FIGS. 3 and 4 are cross-sectional views illustrating belt 20 interacting with groove 106 of roller 102. In one implementation, belt 20 interacts with groove 104 of roller 100 in a similar fashion. As shown by FIGS. 3 and 4, groove 106 comprises a floor 110 and opposing inner side surfaces 112, 114. Floor 110 comprises an inner surface of groove 106 that generally faces a bottom of belt guide 28 in a direction towards web 24. In the example illustrated, floor 110 is substantially flat or level, parallel to the immediate flat plane 116 that extends across groove 106 and that is tangential to the generally circumferential surface 118 of roller 102. In other implementations, floor 110 may be rounded, or tapered with floor 110 having little or no contact with belt guide 28.

Inner side surfaces 112, 114 extend between surface 118 and floor 110. Inner side surfaces 112, 114 have profiles or shapes that reduce the tendency of belt guide 28 to ride up on such surfaces, in a direction away from floor 110, in response to a transverse or sideways loading or forces in either of the directions indicated by arrows 120, forces having a component that is parallel to the rotational axes of rollers 100, 102. Inner side surfaces 112, 114 are shaped such that a majority of such surfaces that extend below the outer surface 118 immediately from surface 118 (prior to the possibly rounded junction with floor 110) and that are directly opposite to and face side surfaces of belt guide 28 extend in planes 122, 124, respectively, that are angularly spaced from plane 116 by an angle A of no greater than 100 degrees. In one implementation, inner side surfaces 112, 114 extend in planes 122, 124, respectively, that are angularly spaced from plane 116 by an angle A of no greater than 95°. In the example illustrated, inner side surfaces 112, 114 extend in planes 122, 124, respectively, that are perpendicular to plane 116. As will be described below, in some implementations, inner side surfaces 112, 114 extend in planes 122, 124, respectively, that are angularly spaced from plane 116 by an acute angle A (less than 90°) such that groove 106 has an undercut to enhance retention and capture of belt guide 28.

FIG. 3 illustrates that portion 36 of belt guide 28 (shown in FIG. 2) that is not wrapping about roller 102, but is instead largely linearly extending between rollers 100, 102. Because portion 36 of guide 28 is not winding or wrapping about roller 102, portion 36 is not in a state of expansion, occupying a first percentage of the interior volume of groove 106. As shown by FIG. 3, belt guide 28 comprises bottom 40 and outer side surfaces 42, 44.

Bottom 40 comprises an outer surface of guide 28 that generally faces floor 110 in a direction away from web 24. In the example illustrated, bottom 40 is substantially flat or level, parallel to the immediate flat plane 116 that extends across groove 106 and that is tangential to the generally circumferential surface 118 of roller 102. In other implementations, bottom 40 may pointed, rounded or curved. Bottom 40 has a lowermost extremity sized such that bottom 40 is spaced from surface 34 by a distance D less than the depth of groove 106 even when guide 28 is in large and expanded (as seen in FIG. 4) such that bottom 40 does not engage floor 110 so as to lift web 24 away from the outer surface of roller 102.

Outer side surfaces 42, 44 extend between surface 34 and bottom 40. Outer side surfaces 42, 44 have profiles or shapes that reduce the tendency of belt guide 28 to ride up on such surfaces, in a direction away from floor 110, in response to a transverse or sideways loading or forces in either of the directions indicated by arrows 120, forces having a component that is parallel to the rotational axes of rollers 100, 102. Outer side surfaces 42, 44 are sized and shaped to facilitate insertion of belt guide 28 into grooves 104, 106. As shown by FIG. 3, outer side surfaces 42, 44 of portion 36 of belt guide 28 are largely out of contact with inner side surfaces 112, 114 of groove 106, respectively.

FIG. 4 illustrates that portion 46 of belt guide 28 (shown in FIG. 2) that is wrapping about roller 102. Because portion 46 of guide 28 is winding or wrapping about roller 102, portion 46 is in a state of expansion, occupying a second percentage of the interior volume of groove 106 that is larger than the aforementioned first percentage. As a result, a greater percentage of the surface area of sidewalls 42, 44 of belt guide 28 is in direct contact with interior side surfaces 112, 114 of groove 106 as compared to when belt guide 28 is in the unexpanded state, such as along portion 36.

As shown by FIG. 4, the portion 46 of belt guide 28 wrapping about roller 102 (or roller 100) within groove 106 changes shape such that a majority of the exterior side surfaces 42, 44 that extend immediately from surface 34 (prior to the possibly rounded or tapered junction with bottom 40) and that are directly opposite to and face exterior surfaces 112, 114 extend in planes 50, 52, respectively. Planes 50, 52 are coincident or in abutment with planes 122, 124, respectively and are angularly spaced from plane 116 (and from the plane 117 of containing surface 34 on opposite sides of guide 28 and tangent to the circumferential shape of surface 34 about roller 102) by an angle AG of no greater than 100 degrees. In one implementation, outer or exterior side surfaces 42, 44 extend in planes 52, 54, respectively, that are angularly spaced from plane 117 by an angle A of no greater than 95°. In the example illustrated, outer side surfaces 42, 44 extend in planes 50, 52, respectively, that are perpendicular to plane 117. As will be described below, in some implementations, outer side surfaces 42, 44 extend in planes 50, 52 respectively, that are angularly spaced from plane 117 by an acute angle A (less than 90°) such that guide 28 has an undercut to enhance retention and capture of belt guide 28.

Because angle A is no greater than 100°, transverse forces in either the direction indicated by arrow 120 are less likely to result in surfaces 42 and 44 of belt guide 28 riding up on surfaces 112, 114, respectively, which might otherwise result in dislodgment of guide 28 from groove 106 and misalignment of belt 20. As the angle A decreases in value, the likelihood of surfaces 42 and 44 of belt guide 28 riding up on surfaces 112, 114, respectively, in response to transverse forces in the directions indicated by arrow 120 also decreases. The angle A facilitates enhanced retention of guide 28 within groove 106 to better maintain belt 20 in a correctly aligned state with respect to rollers 100, 102 and with respect to the other components of header in which belt 20 is utilized.

In the example illustrated, belt guide 28 further comprises tapered portions 56 that extend between outer side surfaces 42, 44 and bottom 40. Tapered portion 56 facilitate insertion of guide 28 into groove 106. In other implementations, tapered portions 56 may be omitted or may have other shapes, such as curved or rounded shapes.

In the example illustrated, belt guide 28 is formed from an elastomeric material that is resiliently compressible and flexible such that portion 46 expands into groove 106 as guide 28 is being wound are wrapped about roller 102 (and roller 100) and so as to resiliently return to its original shape (shown in FIG. 3) in portion 36 upon exiting groove 106 and returning to a substantially flat or linear, uncurved state. In one implementation, belt guide 28 is formed from styrene-butadiene rubber (SBR rubber). In other implementations, guide 28 may be formed from other flexible elastomeric materials. In the example illustrated, belt guide 28 and web 24 are integrally formed as a single unitary body from such an elastomeric material. In other implementations, belt guide 24 and web 24 may be bonded, welded, fastened or otherwise attached to one another. In some implementations, web 24 may have cleats which are also integrally formed as part of a single unitary body with web 24 and belt guide 28.

Figure 5:
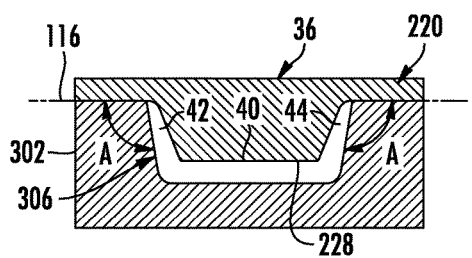
FIG. 5 is a fragmentary sectional view of a first portion another example belt guide of the draper belt of FIG. 1 interacting with another example groove of one of the supporting rollers, wherein the first portion of the belt guide is not wrapping about the supporting roller.
Figure 6:
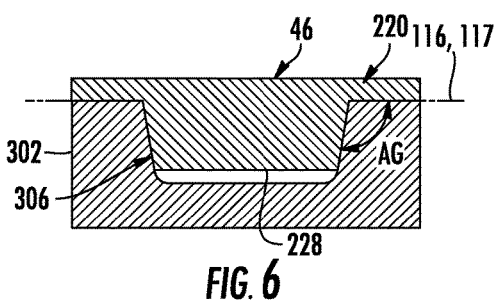
FIG. 6 is a fragmentary sectional view of a second portion of the belt guide of FIG. 5 while the second portion of the belt guide is wrapping about the supporting roller within the groove of FIG. 5.

FIGS. 5 and 6 are cross-sectional views illustrating another example belt 220 interacting with groove 306 of another example roller 302. Belt 220 and roller 302 are similar to belt 20 and roller 102 except that roller 302 comprises groove 306 in lieu of groove 106 while belt 220 comprises belt guide 228 in lieu of belt guide 28. Those remaining components of roller 302 and belt guide 228 which correspond to components of roller 102 and belt guide 28 are numbered similarly. Although FIGS. 5 and 6 illustrate a single roller 202 and its interaction with interaction with belt guide 228 of belt 220, it should be appreciated that belt 220 further wraps about a second roller, similar to roller 100, also having a groove 306 that receives and interacts with belt guide 228 in a similar fashion.

Groove 306 of roller 102 is similar to groove 106 except that interior side surfaces 112, 114 extend at an angle A (defined above) that is greater than the 90° angle A shown in FIGS. 3 and 4. In the example illustrated in FIGS. 5 and 6, angle A is 100°. In other implementations, angle A is less than 100°, but greater than 90°. Likewise, guide 228 is similar to guide 28 except that outer side surfaces 42, 44 extend at an angle AG (defined above) that is greater than the 90° angle AG shown in FIG. 4. In the example illustrated in FIG. 6, angle AG is 100°. In other implementations, angle AG is less than 100°, but greater than 90°. As compared to existing belt guides an existing roller grooves, belt guide 228 and groove 306 provide enhanced retention of a draper belt.

Figure 7:
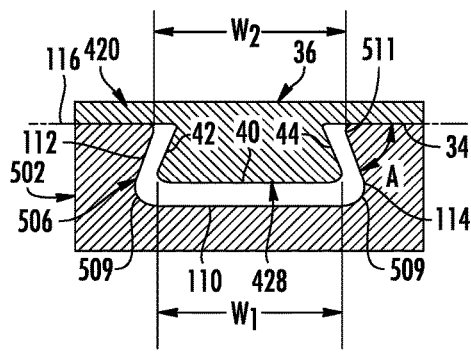
FIG. 7 is a fragmentary sectional view of a first portion of another example belt guide of the draper belt of FIG. 1 interacting with another example groove of one of the supporting rollers, wherein the first portion of the belt guide is not wrapping about the supporting roller.
Figure 8:
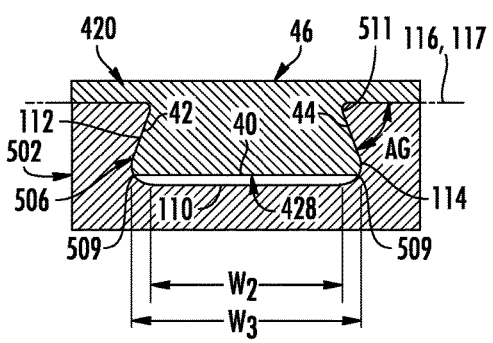
FIG. 8 is a fragmentary sectional view of a second portion of the belt guide of FIG. 7 while the second portion of the belt guide is wrapping about the supporting roller within the groove.
Figure 9:
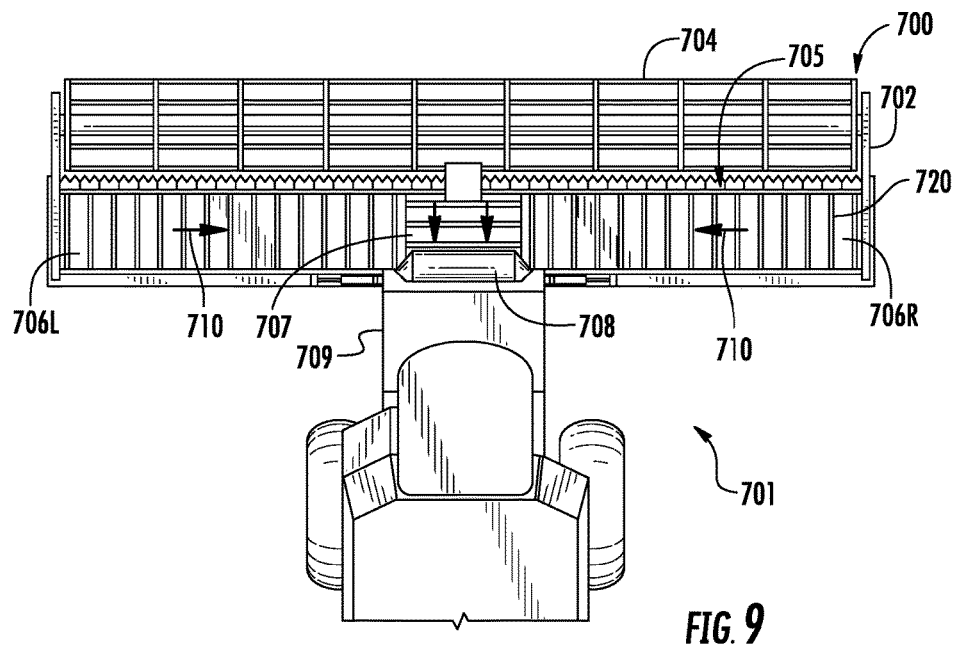
FIG. 9 is a top view of an example harvester header of an example harvester.

FIGS. 7 and 8 are cross-sectional views illustrating another example belt 420 interacting with groove 506 of another example roller 502. Belt 420 and roller 502 are similar to belt 20 and roller 102 except that roller 502 comprises groove 506 in lieu of groove 106 while belt 420 comprises belt guide 428 in lieu of belt guide 28. Those remaining components of roller 502 and belt guide 428 which correspond to components of roller 102 and belt guide 28 are numbered similarly. Although FIGS. 7 and 8 illustrate a single roller 502 and its interaction with belt guide 428 of belt 420, it should be appreciated that belt 420 further wraps about a second roller, similar to roller 100, also having a groove 506 that receives and interacts with belt guide 428 in a similar fashion.

Groove 506 of roller 102 is similar to groove 106 except that interior side surfaces 112, 114 extend at an angle A (defined above) that is acute, being less than the 90° angle A shown in FIGS. 3 and 4. As shown by FIGS. 7 and 8, groove 506 forms opposing undercuts 509. In the example illustrated in FIGS. 7 and 8, angle A is no greater than 80° in other implementations, angle A is less than 80°.

Guide 428 is similar to guide 28 except that outer side surfaces 42, 44 extend at an acute angle AG (defined above as the angle between surfaces 42, 44 and plane 117). Angle AG is less than the 90° angle AG shown in FIG. 4. As shown by FIG. 7, portion 36 of guide 428 has a lower end with a width W1 prior to expansion. In one implementation, the width W1 is less than or equal to the width W2 of the mouth 511 of groove 506, facilitating insertion of portion 36 into groove 506. In the absence of loading or the driving of belt 420, portion 46 of guide 428, that portion that is presently winding or wrapping about roller 102, may also have a width that is less than the width W2 to facilitate its insertion into groove 506. In yet other implementations, portion 36 of guide 428 may have a maximum outer width W1 that is greater than the width W2 of the mouth 511, wherein guide 428 resiliently flexes or temporarily deforms as it is snapped into groove 506.

As shown by FIG. 8 which illustrate portion 46 of belt 520 as it is winding or wrapping about roller 102, guide 428 expands. In one implementation, such expansion results in guide 428 expanding into undercuts 509 of groove 506. After such expansion, belt guide 428 has a width W3 that is greater than the width W2 of mouth 511. The expansion of guide 428 into undercuts 509 further inhibits dislodgment or withdrawal of guide 428 from groove 506.

FIGS. 9-12 illustrate an example harvester head or header 700 as part of a harvester 701. The example header 700 generally comprises frame 702, cutter assembly 520, gathering reels 704, drapers or draper belts 706L, 706R (collectively referred to as draper belts 706), central draper belt 707 and feed drum 708. Frame 702 forms the exterior of header 700 and supports remaining components of header 700. Frame 702 is configured to be releasably mounted to a combine harvester 701.

Gathering reels 704 gather and direct the crop towards cutter assembly 705. Cutter assembly 705 cuts and are severs the crop or plant from soil. Draper belts 706 comprise carpets, platforms or belts which are transversely driven so as to carry the severed plants or crops to central draper 707. Draper belt 706R carries the severed crops in the direction indicated by arrow 710 or draper belt 706L carrier severed crops in the direction indicated by arrow 711. Central draper belt 707 conveys the severed crop material to feed drum 708. Feed drum 708 is rotatably driven so as to move the severed crop material rearwardly into a feeder house 709 of harvester 701 for threshing.

Figure 10:
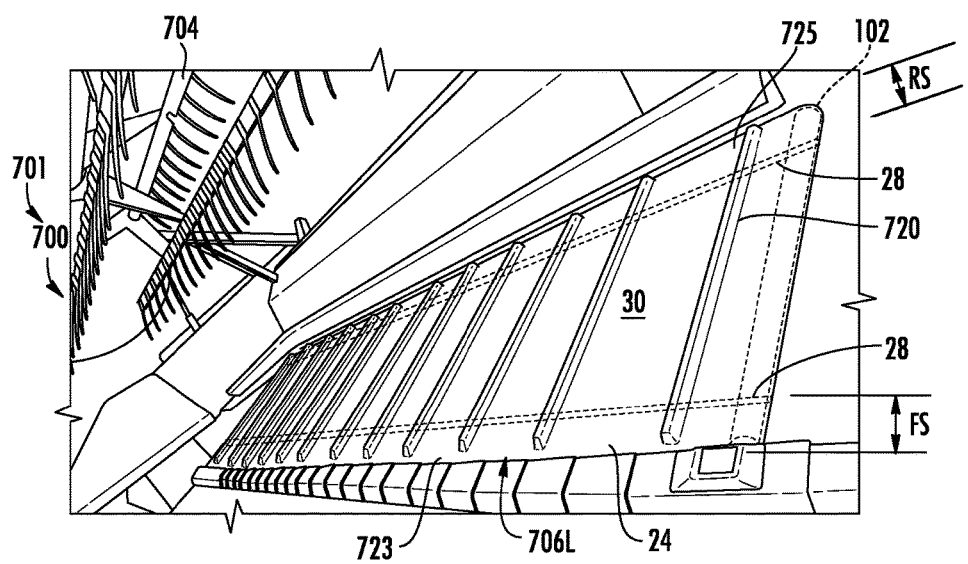
FIG. 10 is a fragmentary perspective view of a portion of the example harvester header of FIG. 9.
Figure 11:
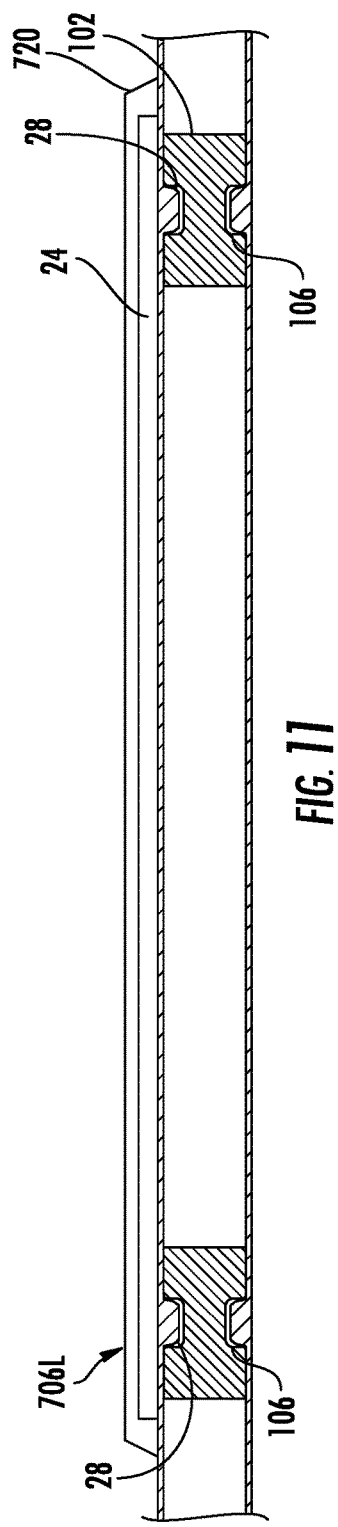
FIG. 11 is a sectional view of an example draper belt of the harvester header of FIG. 10, illustrating a first state of example belt guides when not wrapping about supporting rollers.
Figure 12:
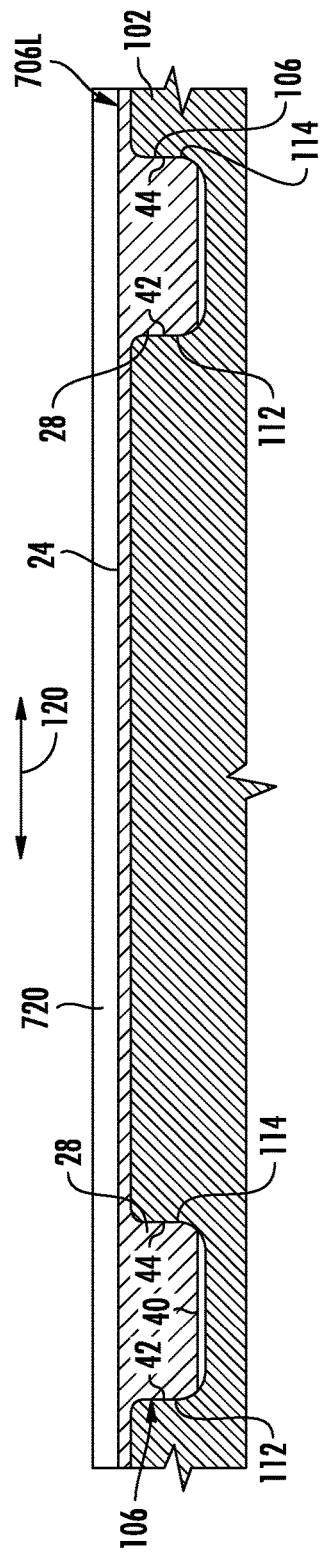
FIG. 12 is a sectional view of the example draper belt of the harvester head of FIG. 10, illustrating a second state of example belt guides when wrapping about supporting rollers within grooves of the supporting rollers.

FIGS. 10-12 illustrate draper belt 706L in more detail. Draper belt 706L is similar to draper belt 706R. Draper belt 706L is similar to draper belt 20 described above except that draper belt 706L comprises exterior cleats 720 and a pair of transversely spaced belt guides 28 (shown in broken lines in FIG. 10) which are received in track within a corresponding pair of transversely spaced grooves 106 of roller 102 (identified by broken lines in FIG. 10 and shown in FIGS. 11 and 12). Although not specifically illustrated, should be appreciated that belt 706L wraps about another roller at an opposite end, wherein the other roller also includes grooves 106 that receive guides 28. Those components of draper belt 706L and roller 102 which correspond to belt 20 and roller 102 of FIGS. 1-4 are numbered similarly.

Cleats 720 comprise ribs, bars or other structures projecting from surface 30 of webbing 24. Cleats 720 transversely extend across webbing 24. Cleats 720 assist in conveying crop material. In other implementations, cleats 720 may have other configurations or may be omitted.

FIG. 11 illustrates portion 36 of guides 28 prior to guides 28 wrapping about roller 102 (or the other roller). FIG. 12 illustrates portion 46 of guides 28 received within the grooves 106 of roller 102. Guides 28 interact with grooves 106 of roller 102 as described above respect to FIGS. 2-4. However, the pair of grooves 106 on each roller and the pair of corresponding guides 28 on belt 706L further enhances retention of belt 706L on the rollers and with respect to the remaining components of header 700.

In one implementation, belt 706L has a front most guide 28 that is transversely spaced from the front edge 723 by a front spacing FS of no greater than 200 mm and a rearmost guide 28 that is transversely spaced from the rear edge 725 by rear spacing RS of no greater than 200 mm. The close proximity of guides 28 to the front edge 723 and the rear edge 725 of belt 706L may enhance retention of belt 706L in an aligned state.

As shown by FIG. 12, as belt 706L wraps about roller 102 with guides 28 received within grooves 106, guides 28 undergo expansion such that outer side surfaces 42, 44 expand into abutment with the interior side surfaces 112, 114 of grooves 106. As discussed above, because interior side surfaces 112, 114 of groove 106 and the expanded outer side surfaces 42, 44 each extend at angles A and AG less than 100°, guides 28 are less likely to ride up surfaces 112, 114 when encountering forward or rearward forces in the directions as indicated by arrows 120, better retaining guides 28 within grooves 106 and better maintaining belt 706L in an aligned state.

Although draper belt 706L of header 700 is illustrated as having roller 102 with grooves 106 that receive belt guides 28 and that interact with one another as described above with respect to FIGS. 3 and 4, in other implementations, draper belt 706L may include a pair of spaced guides having other configurations such as the configuration of guides 228, 428 and the configuration of grooves 306, 506 which interact with one another as described above with respect to FIGS. 5-6 or FIGS. 7-8, respectively. Although draper belt 706L is described as having similar belt guides and corresponding grooves along both the front edge 723 and the rear edge 725, in other implementations, draper belt 706L may have a first belt guide and corresponding roller grooves proximate to front edge 723 and a second differently configured belt guide and corresponding roller grooves proximate to rear edge 725. For example, in one implementation, draper belt 706L may have belt guide 28 and its corresponding groove 106 in each of the rollers 100, 102 proximate one of the front edge 723 and the rear edge 725 while having belt guide 428 and its corresponding groove 506 in each of the rollers 100, 102 proximate to the other of the front edge 723 and the rear edge 725.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An apparatus comprising:
    a draper belt for a head of a harvester, the draper belt to extend about a roller having an outer groove encircling the roller, the draper belt to be driven in a first direction and comprising:
        a web having a first surface to carry crop material and a second surface to face the roller;
        an elastomeric belt guide projecting from the second surface, the belt guide having outer side surfaces extending at an angle of no greater than 100° relative to the second surface when the belt guide is wrapping about the roller within the groove.
2. The apparatus of claim 1, wherein the outer side surfaces are shaped and formed from a material so as to expand into abutment with interior side surfaces of the outer groove as the belt guide wraps about the roller within the groove.

3. The apparatus of claim 1, wherein each of the outer side surfaces extends at an angle of less than 95° relative to the second surface when the belt guide is wrapping about the roller within the groove.

4. The apparatus of claim 1, wherein each of the outer side surfaces extends at an acute angle relative to the second surface when the belt guide is wrapping about the roller within the groove.

5. The apparatus of claim 3, wherein the groove has mouth having a width and wherein the elastomeric feature is sized such that the outer side surfaces are spaced by a first maximum distance less than the width along portions of the web in a flat state and are spaced by a second maximum distance greater than the width along portions of the belt guide wrapping about the roller within the groove.

6. The apparatus of claim 1 further comprising the roller, wherein the outer groove has inner side surfaces, each of the inner side surfaces extending at an angle of no greater than 100° relative to an outer surface of the roller.

7. The apparatus of claim 5, wherein the inner side surfaces are perpendicular to the outer surface of the roller.

8. The apparatus of claim 5, wherein the inner side surfaces extend at an acute angle with respect to the outer surface of the roller so as to form an undercut about the roller.

9. The apparatus of claim 5, wherein each of the inner side surfaces extends at a first angle of no greater than 100° relative to the outer surface of the roller and wherein each of the outer side surfaces of the feature extend at second angle relative to the second surface when in a flat state, the second angle being greater than the first angle.

10. The apparatus of claim 1, wherein the draper belt is an endless belt.

11. The apparatus of claim 1, wherein the draper belt is a seamed belt.

12. The apparatus of claim 1, wherein the belt guide continuously extends along a length of the belt.

13. The apparatus of claim 1, wherein the belt guide is shaped and sized to occupy a first percent of a volume of the groove when in a flat state and occupies a second percent of the volume of the groove, greater than the first percent of the volume of the groove, when the belt guide is wrapping about the roller within the groove.

14. A harvester head comprising:
a first roller having first outer groove;
a second roller having a second outer groove;
a draper belt extending about the first roller and the second roller, the draper belt comprising:
a web having a first surface to carry crop material and a second surface to face the roller;
an elastomeric belt guide projecting from the second surface, the belt guide comprising:
a first portion in a flat state between the first roller and the second roller, the first portion having a first shape different than the outer groove; and
a second portion within the first outer groove, the second portion having a second shape, different than the first shape, in abutment with interior sides the first outer groove.

15. The harvester head of claim 14, wherein the outer groove has inner side surfaces, each of the inner side surfaces extending at an angle of no greater than 100° relative to an outer surface of the roller.

16. The apparatus of claim 15, wherein the inner side surfaces are perpendicular to the outer surface of the roller.

17. The apparatus of claim 15, wherein the inner side surfaces extend at an acute angle with respect to the outer surface of the roller so as to form an undercut about the roller.

18. The apparatus of claim 15, wherein each of the inner side surfaces extends at a first angle of no greater than 100° relative to the outer surface of the roller, wherein the belt guide has outer side surfaces and wherein each of the outer side surfaces of the belt guide extend at second angle relative to the second surface when in a flat state, the second angle being greater than the first angle.

19. A harvester head comprising:
a drive roller;
an idler roller, wherein the drive roller and the idler roller are to support a draper belt extending about the drive roller and the idler roller and wherein the drive roller and the idler roller each comprise an outer groove, the outer groove of the drive roller and the idler roller having inner side surfaces extending at an angle of no greater than 100° relative to an outer surface of the roller.

20. The harvester head of claim 19, wherein the inner side surfaces extend at an angle of no greater than 95° relative to the outer surface of the roller.

* * * * *